United States Patent [19]

Melchior

[11] Patent Number: 4,544,575

[45] Date of Patent: Oct. 1, 1985

[54] METHOD OF MAKING GLASS PANELS WITH SELECTIVE RADIATION-BLOCKING EFFECT

[75] Inventor: Bernd Melchior, Remscheid, Fed. Rep. of Germany

[73] Assignee: IMC Acrylguss GmbH, Remscheid, Fed. Rep. of Germany

[21] Appl. No.: 537,267

[22] Filed: Sep. 29, 1983

[30] Foreign Application Priority Data

Sep. 29, 1982 [DE] Fed. Rep. of Germany ....... 3235964

[51] Int. Cl.$^4$ ............................ B05D 5/06; B05D 5/02
[52] U.S. Cl. ........................................ 427/74; 156/327; 156/329; 350/164; 427/166; 428/429; 428/432; 428/441
[58] Field of Search ................... 427/74, 76, 166, 167; 350/164, 165, 166; 428/441, 442, 432, 429; 156/327, 329

[56] References Cited

U.S. PATENT DOCUMENTS

| | | | |
|---|---|---|---|
| 3,849,244 | 11/1974 | Groth ............................. | 350/164 X |
| 4,294,881 | 10/1981 | Meyer et al. .................... | 428/432 X |
| 4,358,507 | 11/1982 | Senaha et al. ................... | 428/432 X |
| 4,368,945 | 1/1983 | Fujimori et al. ................. | 350/166 X |
| 4,397,976 | 8/1983 | Mori et al. ...................... | 428/441 X |

FOREIGN PATENT DOCUMENTS

56-89724  7/1981  Japan .................................... 428/432

*Primary Examiner*—Michael R. Lusignan
*Attorney, Agent, or Firm*—Karl F. Ross; Herbert Dubno

[57] ABSTRACT

A glass panel designed to block the transmission of selected radiation, especially heat rays, is produced by coating a face of a first glass pane with a layer of a material (e.g. metal) reflecting or absorbing the rays to be blocked, spacedly juxtaposing a second glass pane with the coated face of the first pane, introducing a preferably transparent synthetic resin such as polymethylmethacrylate or silicone rubber in a flowable state into the intervening space, and letting the resin harden in that space. The resin may be injected through an inlet port in a profiled frame temporarily surrounding the assembly, this frame also having a venting aperture at a level above that of the inlet port.

12 Claims, 1 Drawing Figure

U.S. Patent   Oct. 1, 1985   4,544,575
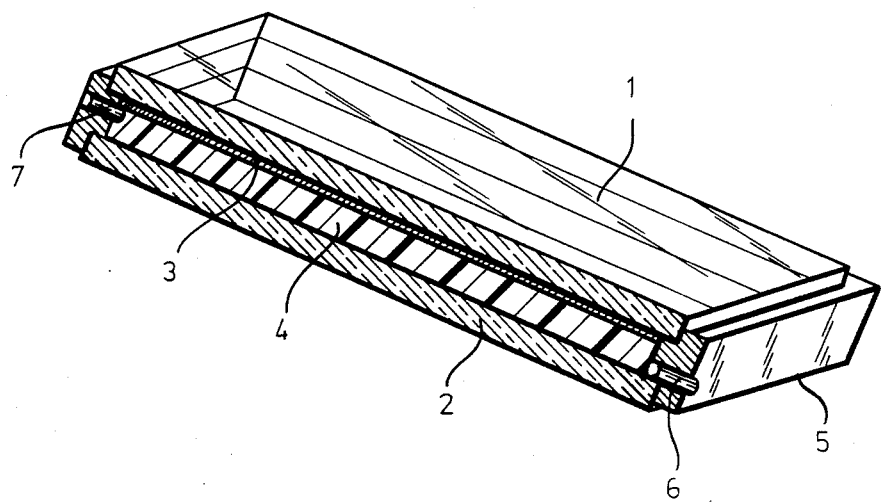

4,544,575

METHOD OF MAKING GLASS PANELS WITH SELECTIVE RADIATION-BLOCKING EFFECT

FIELD OF THE INVENTION

My present invention relates to a method of manufacturing a glass panel designed to block the transmission of certain radiation (e.g. heat or infrared rays) therethrough, e.g. for the sake of comfort or to convert the blocked radiation into electrical energy.

BACKGROUND OF THE INVENTION

Panels of this description are useful, for example, in thermally insulating windows for buildings or vehicles, in solar collectors, in anti-glare vehicular windshields, or—when of limited width in relation to their length—as strips for shutters or blinds. They are generally formed with two spaced-apart glass panes at least one of which is coated on its inner face—confronting the other pane—with a layer of a material suitable for the intended purpose, e.g. as a reflector or absorber of infrared radiation or as a photoconductor; this material is usually applied by vapor deposition. The space separating the panes of such a compound glass panel may be filled with air or some other gas. It has also been proposed to insert a transparent foil of resinous material between these panes; in practice, however, the presence of this foil often gives rise to friction between it and the radiation-blocking layer on account of thermal expansion or contraction whereby that layer can be severly damaged. Also, imperfect contact between the foil and the layer produces voids or streaks impairing the light transmissivity of the panel.

OBJECT OF THE INVENTION

Thus, the object of my invention is to provide a method of making such a panel which is structurally stronger than one with a gas-filled interspace yet obviates the aforedescribed drawbackes of foil-type assemblies.

SUMMARY OF THE INVENTION

I realize this object, in accordance with my present invention, by providing two spaced-apart glass panes—at least one of them internally coated as described above—and filling the intervening space with a polymeric mass in a flowable state which is thereupon allowed to harden. This mass, upon hardening, adheres uniformly to the radiation-blocking layer and, if both are transparent, avoids any unsightly blemishes or interference with the field of vision.

The layer, which may be a very thin coating of metal or metal oxide, may operate as a heat shield, a color filter, a photoconductor or a combination thereof. It may also be used as a conductor of externally generated electric current in, say, a window or door included in a burglar-alarm system. When the polymeric mass has elastic properties after hardening, it will impart a shatterproof character to the panel. Silicone rubbers are particularly desirable for this purpose. Conventional plasticizers, such as phthalates, may be included.

Other transparent plastics such as acrylic resins, e.g. polymethylmethacrylate, are also highly suitable for use in panels produced by my present process.

A particularly advantageous procedure for filling the interspace between the glass panes with the polymeric mass involves the temporary rigidification of the assembly with the aid of a surrounding frame allowing that mass to be introduced either by pouring or by injection under pressure. With glass panes having coextensive four-sided (e.g. square or rectangular) outlines the frame should extend around at least three of these sides, possibly leaving the fourth one open for pouring. I prefer, however, to enclose the panes on all four sides while providing the frame with an inlet port at one side and with a venting aperture for the escape of displaced air at a remote location, especially at an opposite side. With injection under pressure, the venting aperture can be located at a level higher than that of the inlet port to minimize possible overflow of resin.

BRIEF DESCRIPTION OF THE DRAWING

The above and other features of my invention will now be described in detail with reference to the accompanying drawing the sole FIGURE of which schematically illustrates, in a cross-sectional perspective view, a panel manufactured in accordance with this invention

SPECIFIC DESCRIPTION

In the drawing I have shown two rectangular glass panes 1 and 2, parallel to each other, inclined at an acute angle to the horizontal. These panes may have a thickness of about 2 mm and are separated by a space whose width is of approximately the same size. The upper pane 1 is provided on its lower surface with a very thin coating 3, e.g. of aluminum, tin or an oxide thereof, applied to it by vapor deposition. The assembly of panes 1, 2 is surrounded on all sides by a frame 5 with a T-shaped profile which keeps the panes apart and has an inlet port 6 at its lowest side as well as a venting aperture 7 for the escape of air at its highest side. A mass of preferably transparent polymeric material, such as an acrylic resin, is injected in a flowable state through port 6 into the intervening space to form a filler 4 which bonds upon hardening to layer 3 and to the lower pane 2, uniting the two panes into a solid compound glass panel. When hardening is complete, the T-profile frame 5 can be removed.

I claim:

1. A method of making a glass panel able to block certain radiation, comprising the steps of:
   (a) coating one face of a first glass plate with a layer that is substantially nontransmissive for the radiation to be blocked by vapor deposition of said layer on said one face of said first glass plate;
   (b) spacedly juxtaposing a second glass plate with said one face of said first glass plate;
   (c) Thereafter filling the space separating said glass plates with a liquid polymerizable mass of a synthetic resin which, upon hardening, adheres to said layer; and
   (d) allowing said mass to harden in said space.
2. The method defined in claim 1 wherein said polymeric mass is transparent.
3. The method defined in claim 1 wherein said polymeric mass is an acrylic resin.
4. The method defined in claim 1 wherein said polymeric mass is a silicone rubber.
5. The method defined in claim 1 wherein said polymeric mass includes a plasticizer.
6. The method defined in claim 1 wherein said glass panes have coextensive four-sided outlines, step (c) involving surrounding said glass panes on at least three sides with a frame holding them spaced apart and introducing said polymeric mass into the intervening frame through the fourth side.

7. The method defined in claim 6 wherein the polymeric mass is injected through an inlet port formed in said frame at said fourth side while displaced air is allowed to escape through an aperture in said frame remote from said inlet port.

8. The method defined in claim 7 wherein said aperture is located on the side of said frame opposite said fourth side and during injection is elevated above the level of said inlet port.

9. The method defined in claim 1 wherein said layer is made of heat-absorbing material.

10. The method defined in claim 1 wherein said layer is made of heat-reflecting material.

11. The method defined in claim 1 wherein said layer is made of photoelectric material.

12. The method defined in claim 1 wherein said polymeric mass is elastic upon hardening.

* * * * *